United States Patent
Rajaraman et al.

(10) Patent No.: US 11,287,346 B2
(45) Date of Patent: *Mar. 29, 2022

(54) PRESSURE SENSOR SYSTEM, MEASURING DEVICE AND METHOD FOR THE MANUFACTURE THEREOF HAVING A SUPPORT STRUCTURE BEING FORMED BY A LAND GRID ARRAY/MOLD PREMOLD STRUCTURE

(71) Applicant: Robert Bosch GmbH, Stuttgart (DE)

(72) Inventors: Vijaye Rajaraman, Villach (AT); Conrad Haeussermann, Trochtelfingen (DE); Florian Guffarth, Reutlingen (DE); Lars Sodan, Balingen (DE); Eckart Schellkes, Taipei (TW); Thomas Klaus, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 241 days.

This patent is subject to a terminal disclaimer.

(21) Appl. No.: 16/633,051

(22) PCT Filed: Jul. 16, 2018

(86) PCT No.: PCT/EP2018/069194
§ 371 (c)(1),
(2) Date: Mar. 5, 2020

(87) PCT Pub. No.: WO2019/020410
PCT Pub. Date: Jan. 31, 2019

(65) Prior Publication Data
US 2020/0232865 A1 Jul. 23, 2020

(30) Foreign Application Priority Data
Jul. 26, 2017 (DE) .................. 10 2017 212 838.0

(51) Int. Cl.
*G01L 19/14* (2006.01)
*G01L 19/00* (2006.01)

(52) U.S. Cl.
CPC ........ *G01L 19/148* (2013.01); *G01L 19/0007* (2013.01); *G01L 19/0061* (2013.01)

(58) Field of Classification Search
None
See application file for complete search history.

(56) References Cited

U.S. PATENT DOCUMENTS 6,311,561 B1  11/2001  Bang et al.
6,577,244 B1   6/2003  Clark et al.
(Continued)

FOREIGN PATENT DOCUMENTS

CN     101405588 A     4/2009
DE     102004036035    7/2005
(Continued)

OTHER PUBLICATIONS

International Search Report dated Oct. 18, 2018 for corresponding International Application PCT/EP2018/069194, filed Jul. 16, 2018.

*Primary Examiner* — Peter J Macchiarolo
*Assistant Examiner* — Jermaine L Jenkins
(74) *Attorney, Agent, or Firm* — Norton Rose Fulbright US LLP; Gerard Messina

(57) ABSTRACT

A pressure sensor system including at least one pressure sensor unit, the pressure sensor unit being configured with at least one sensor element which is situated in a cavity of a support structure, signal processing elements being integrated into support structure, the at least one sensor element being embeddable into the support structure to form the pressure sensor unit, and the support structure being formed by a land grid array/mold premold structure (LGA/MPM). The pressure sensor unit is introduced into a sensor housing (Continued)

to be provided with a diaphragm and is supported therein, a residual volume of the sensor housing, which is provided with at least one diaphragm and to the wiring of which the pressure sensor unit is electrically connected, being filled with an incompressible fluid. Also described is a method for manufacturing such a pressure sensor system and a measuring device.

14 Claims, 3 Drawing Sheets

(56) References Cited

U.S. PATENT DOCUMENTS

| | | |
|---|---|---|
| 6,938,490 B2 | 9/2005 | Wagner et al. |
| 7,162,926 B1 | 1/2007 | Guziak et al. |
| 9,425,119 B2 * | 8/2016 | Chang .................. B81B 7/0061 |
| 2010/0199777 A1 * | 8/2010 | Hooper ................. G01L 19/141 |
| | | 73/721 |
| 2011/0036174 A1 * | 2/2011 | Hooper ................. B81B 7/0061 |
| | | 73/721 |
| 2015/0076630 A1 | 3/2015 | Low et al. |
| 2015/0162264 A1 | 6/2015 | Chang et al. |
| 2016/0061677 A1 * | 3/2016 | Han ..................... G01L 9/0045 |
| | | 257/415 |
| 2017/0089793 A1 | 3/2017 | Fetisov et al. |

FOREIGN PATENT DOCUMENTS

| | | |
|---|---|---|
| DE | 102007003544 | 7/2008 |
| DE | 102012210752 | 1/2014 |
| EP | 1810947 | 7/2007 |
| EP | 1870687 | 12/2007 |
| GB | 2370638 | 7/2002 |
| JP | 3370593 B2 | 1/2003 |
| JP | 2005249795 A | 9/2005 |
| JP | 4548066 B2 | 9/2010 |
| JP | 5792106 B2 | 10/2015 |
| JP | 6807486 B2 | 1/2021 |

* cited by examiner

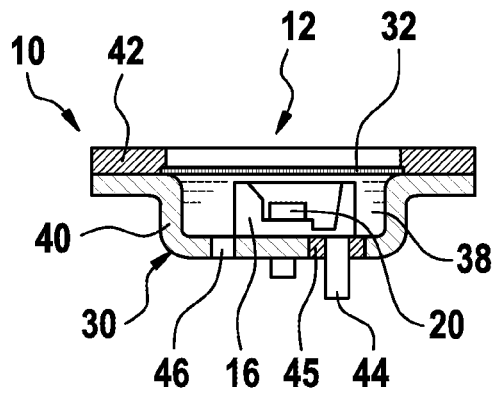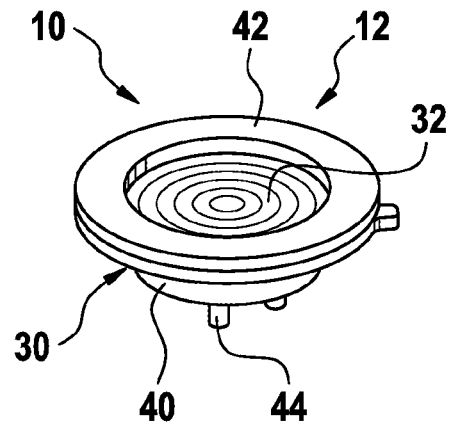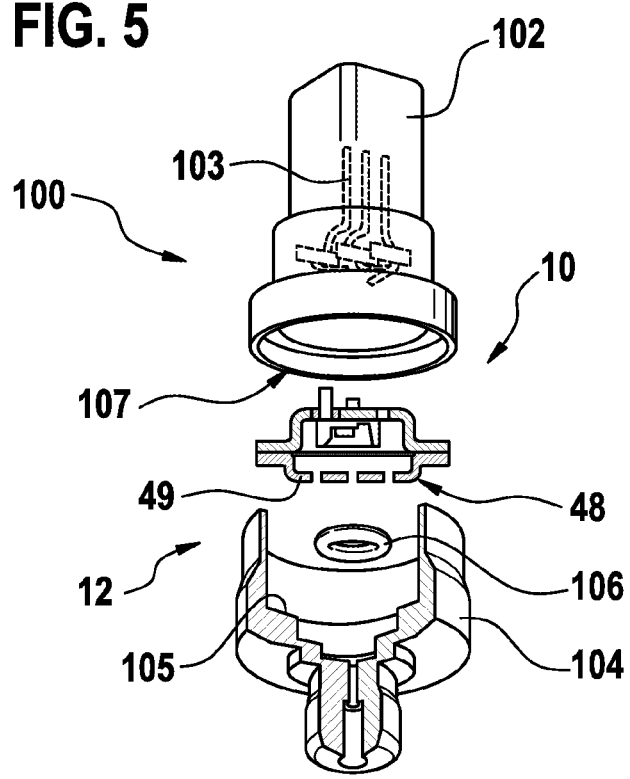

PRESSURE SENSOR SYSTEM, MEASURING DEVICE AND METHOD FOR THE MANUFACTURE THEREOF HAVING A SUPPORT STRUCTURE BEING FORMED BY A LAND GRID ARRAY/MOLD PREMOLD STRUCTURE

FIELD OF THE INVENTION

The present invention relates to a pressure sensor system including at least one pressure sensor unit, and to a method for manufacturing a pressure sensor system which includes at least one pressure sensor unit. The present invention furthermore relates to a measuring device into which at least one such pressure sensor system is integrated.

BACKGROUND INFORMATION

Pressure sensor systems including micromechanically processed electronic pressure sensors (MEMS pressure sensors) are known, which include at least one deformable pressure-sensitive diaphragm which is typically exposed to the media surroundings of interest to continuously measure and monitor the pressure there. While the measurement of the atmospheric pressure in consumer electronics applications only requires a stable sensor module within a protective housing (such as of a cell phone), the same electronic pressure sensor in industrial or automotive applications requires the use with an insulating medium (such as a gel or oil) as additional protection against dust, particles, moisture or exhaust gases as well as further corrosive or aggressive media.

Approaches to such challenges of media insulation by forming a robust module are already discussed, for example, in U.S. Pat. No. 6,311,561 B1, U.S. Pat. No. 6,577,244 B2, and U.S. Pat. No. 6,938,490 B2.

In the case of gel-filled sensors, it may prove to be disadvantageous, when these are exposed to corrosive or aggressive media such as exhaust gases, that the particular gases are still able to act on the gel, despite the protection, and corrosively attack metallic compounds of the MEMS pressure sensor, its ASIC and the substrate. Their reliability and functionality may be impaired thereby in the long term. For this reason, both the active region of the MEMS sensor (i.e., for example, its piezoelectric resistors) and of the application-specific integrated circuit (ASIC; signal processing electronics) should not be exposed to such aggressive media. In addition to such reliability problems, the aforementioned gels may also be reason for concern as to the effect that they may tend toward bubbling and/or foaming at pressures above 5 bar. The use of a buffer formed by an oil instead of a gel in applications where media insulation of components of the sensor system is necessary represents a suitable alternative in this connection.

Steel diaphragms may typically be utilized in uses of oil-filled pressure sensors, which close a plastic or metal housing in which the sensor element for the pressure determination is situated and surrounded by an incompressible oil for relaying the pressure force. Even though sensor elements are very resistant to the aggressive media, in their manufacture, however.

SUMMARY OF THE INVENTION

The present invention is therefore to provide a pressure sensor system including at least one pressure sensor unit which, on the one hand, is robust or protected against aggressive media, but, on the other hand, also allows a simple temperature adjustment to compensate for the influence of the oil filling with the aid of the temperature, and additionally is cost-effective to manufacture.

The approach having the features described herein is, in particular, that the pressure sensor unit including at least one sensor element, which is situated in a cavity of a support structure, is provided at the pressure sensor system, signal processing elements being integrated into the support structure, and the at least one sensor element being embedded (molded) with the support structure to form the pressure sensor unit, and the support structure being formed by a land grid array/mold premold structure (LGA/MPM). The sensor unit is to be introduced into a sensor housing to be provided with a diaphragm and to be supported therein, and a residual volume of the sensor housing, which is provided with at least one diaphragm and closed thereby and to the wiring of which the sensor unit is electrically connected, is to be filled with an incompressible fluid.

The present invention accordingly provides a protection for a LGA/MPM support structure, which is embedded or molded with a sensor element to form a pressure sensor unit, against aggressive media in a suitable manner and, in particular, using a simple apparatus/device (arrangement) and in a cost-effective manner. When using a suitable sensor element, the pressure sensor unit may already be adjusted prior to being situated in the pressure sensor housing, individually, but also simultaneously in entire batches. With its cavity, the MPM portion in which the ASIC is pre-embedded (premolded) so-to-speak forms a dedicated inner housing for the sensor element.

The pressure sensor unit may advantageously be provided with a so-called lead frame, at which the pressure sensor element is electrically connectable to the ASIC, for which purpose the respective signal pins are bonded to the frame. In the case of the ASIC, this takes place prior to the joining process of casting, the pressure sensor element being bonded subsequently. The pressure sensor unit, including the sensor element situated at the LGA/MPM, may also be referred to as a system in package (SiP). The ASIC provides various basic functions which are already integrated into its electronic system, the ASIC being responsible for the power supply of the sensor element, evaluating its voltage signal and, if necessary, its temperature signal, and moreover carrying out a characteristic curve correction of the pressure measurement, and furthermore it being possible for it to be provided with filters and a signal processing electronic system as well as diagnostic and error detection functions. As a result of the input-side digitization, the ASIC may enable overall digital signal processing (for example for the bridge signal of the resistors), and also trigger the data transmission with the aid of an internal clock rate. For example, it may also be directly connected to a control unit.

The subject matter of the further descriptions herein includes further advantageous features. In one advantageous embodiment of the pressure sensor system according to the present invention, which is manufacturable with little complexity, the support structure may be configured with an LGA/MPM in such a way that electrical contact elements are provided at its one structure side, while a cavity for situating the sensor element is provided at its other, opposite structure side facing away from the contacts. At the side provided with the contacts, the substrate of the LGA/MPM may advantageously be provided, for example the signal electronic system in the form of the ASIC may be situated between the two. At the side facing away from the support structure, in turn, the substrate may include so-called bond pads including a metallization as contact elements for the electrical contacting. Configurations in which the contact elements are situated on the same side as the MPM structure are also conceivable.

In another advantageous embodiment, the sensor element may be provided and configured as an advanced porous silicon MEMS (APSM) sensor element, which is situated in a precast cavity of the LGA/MPM. The sensor element is advantageously manufactured in an advanced porous silicon diaphragm (APSM) process, in which a monocrystalline starting layer for the later diaphragm is created. It is subsequently undercut based on an etching method, and a porous silicon layer is generated, where subsequently a cavity will be situated. Afterwards, a monocrystalline silicon layer is epitaxially applied, which later forms the sensor element diaphragm. A cavity is created under a vacuum by the thermal application (atom rearrangement), which later allows the absolute pressure measurement. Piezoelectric resistors applied to the diaphragm then measure the deflection of the diaphragm. A robust diaphragm may be created using this APSM process, which is described in DE 10 2004 036 035 A1 and EP 1810947 B1, and this process moreover advantageously requires only surface mechanical processing. The resulting monocrystalline layer is absolutely tight and stable. However, the sensor element may also be configured differently, for example as a so-called stress-decoupled sensor element.

In a further advantageous embodiment, the support structure at the pressure sensor system according to the present invention may be provided with further passive electrical structures or components, which are introduced into its substrate. As was already mentioned above, the sensor element diaphragm was from a monocrystalline silicon layer, at which resistors may be situated, which may be diffused into the layer, for example, so that a change in resistance occurs during the application, as a function of the deformation of the sensor element diaphragm, the resistors being connected in the manner of a Wheatstone bridge in the process. Since no voltage is generated in the process, but only the electrical resistance is changed with the aid of the pressure change, these are passive elements or structures, whose temperature dependence may also be eliminated by the bridge circuit. Such sensors have a relatively high sensitivity and may be manufactured at favorable costs.

To be able to advantageously protect the diaphragm of the pressure sensor unit, which is situated at the sensor housing and senses and relays the applied pressure, against undesirable mechanical influences, such as pressure peaks, in a volume flow to be measured, a mechanical protective member, which essentially covers the diaphragm indirectly, may be situated on the side of the diaphragm facing away from the sensor housing in another refinement of the pressure sensor system. This may, for example, be a perforated plate or a kind of grating extending essentially in parallel to the diaphragm and connected to the housing. The particular breakthroughs allow access of the medium to be measured to the diaphragm, whose pressurization may then be forwarded to the sensor element diaphragm. However, other configurations are also conceivable.

Protecting the sensor element appropriately against aggressive and/or corrosive media, the incompressible fluid may be configured as oil, for example as synthetic oil. After the pressure sensor unit has been situated inside the pressure sensor housing, remaining residual volumes may advantageously, for example, and if necessary, also among other things, be filled with the particular incompressible fluid prior to closing the housing with a diaphragm or another closure, so that protection of the sensor element or of the pressure sensor unit on all sides is ensured. The use of other incompressible media, such as other suitable oils, is also conceivable.

In an advantageous refinement of the pressure sensor system, the configuration of the oil buffer is also important, which advantageously provides the positioning of the pressure sensor unit inside the pressure sensor housing in such a way that the sensor element is permanently exposed to an isostatic pressure as a result of being embedded on all sides in the oil buffer, so that physical damage of the pressure sensor unit may also be reliably avoided thereby.

According to a further description, the present invention also creates a method for manufacturing a pressure sensor system, including at least the following method steps:
  manufacturing the pressure sensor unit by providing a sensor element, situating the sensor element in a cavity of a LGA/MPM support structure into which at least one signal processing element is integrated, and subsequently embedding the sensor element in the support structure to form the pressure sensor unit;
  introducing the pressure sensor unit into a pressure sensor housing to be provided with a diaphragm, and supporting the pressure sensor unit in the pressure sensor housing;
  connecting the pressure sensor unit to the electrical wiring of the pressure sensor housing, filling a residual volume remaining inside the pressure sensor housing with an incompressible fluid; and
  closing the pressure sensor housing by a diaphragm or an opening closure.

The described method also ensures protection for a LGA/MPM support structure, into which a sensor element is embeddable (moldable) to form a pressure sensor unit, against aggressive media in a suitable manner and, in particular, using a simple apparatus/device (arrangement) and in a cost-effective manner. When using a suitable sensor element, the pressure sensor unit may already be adjusted prior to being situated in the pressure sensor housing, individually, but also simultaneously in entire batches. Again, with its cavity, the MPM portion into which the ASIC is introduced (premolded) forms a dedicated inner housing for the sensor element. The pressure sensor unit may advantageously be provided with a so-called lead frame, at which the pressure sensor element is electrically connectable to the ASIC, for which purpose the respective signal pins are bonded to the frame. In the case of the ASIC, this takes place prior to the joining process of casting, the pressure sensor element being bonded subsequently.

One advantageous variant of the method according to the present invention may be to compensate the pressure sensor unit including the sensor element with respect to the temperature, prior to the embedding into the pressure sensor housing, so that an already adjusted pressure sensor unit is usable immediately or at any time in a pressure sensor system, which additionally may be cost-effectively provided, since this adjustment is implementable in a short time, when parameters are known, at the LGA/MPM pressure sensor unit as a system in package for many pressure sensor units. This is also related to the circumstance that these pressure sensor units may be produced and processed by standard machines common in the fabrication of semiconductors, in particular of MEMS modules, and their assembly into measuring modules.

In an easy to handle variant of the method, which already protects the sensor element diaphragm against the access of damaging mechanical influences directly after positioning within the pressure sensor housing, the electrical terminals of the sensor element, after its introduction into the pressure sensor housing, may be situated facing away from the housing diaphragm in the usage position, so that they are exposed on the open housing side. Moreover, they may then be easily interconnected, and after the interconnection, the closure part of the housing may be situated over the open side, and the housing may thus be closed.

After filling with the incompressible fluid, the particular filling opening at the pressure sensor housing may be closed and sealed, for example, with the aid of a ball pressing.

To minimize the fluid volume of incompressible liquid/fluid in the interior of the pressure sensor housing, in another variant of the method according to the present invention at least one filling element, which may be a multitude of filling elements, may be situated between one or multiple housing areas of the pressure sensor housing and the sensor element. These may be plastic-like, ceramic or metallic parts, which are also referred to as spacers. In one other variant, for example, one filling element, or a multitude of filling elements, may then form a closed structure within the pressure sensor housing, if necessary, together with the sensor element.

A measuring device according to the present invention is defined in a further description herein. A sealing apparatus/device (arrangement), such as an O-ring, may be situatable between the edge area and the flange.

With respect to further features and advantages, reference may be made to the above comments regarding the pressure sensor system according to the present invention and its manufacturing method.

The above-mentioned embodiments and refinements may be arbitrarily combined with each other, if useful. Further possible embodiments, refinements and implementations of the present invention also include not explicitly described combinations of features of the present invention which are described at the outset or hereafter with respect to the exemplary embodiments. Those skilled in the art will in particular also add individual aspects as improvements or supplements to the particular basic form of the present invention.

The present invention is described in greater detail hereafter based on exemplary embodiments in the partially schematic drawings.

In all illustrations, identical or functionally equivalent elements and devices were denoted by the same reference numerals, unless indicated otherwise.

BRIEF DESCRIPTION OF THE DRAWINGS

FIGS. 4a and 4b show a cut side view and a perspective side view of one further exemplary embodiment of the pressure sensor system, in which its housing is closed by a ball seal.

FIG. 5 shows an exploded perspective side view of one exemplary embodiment of a measuring device according to the present invention, into which a pressure sensor system according to the present invention for applications in the automotive sector is integrated in a media-robust manner in a so-called 2nd level housing.

DETAILED DESCRIPTION

Figure 1:
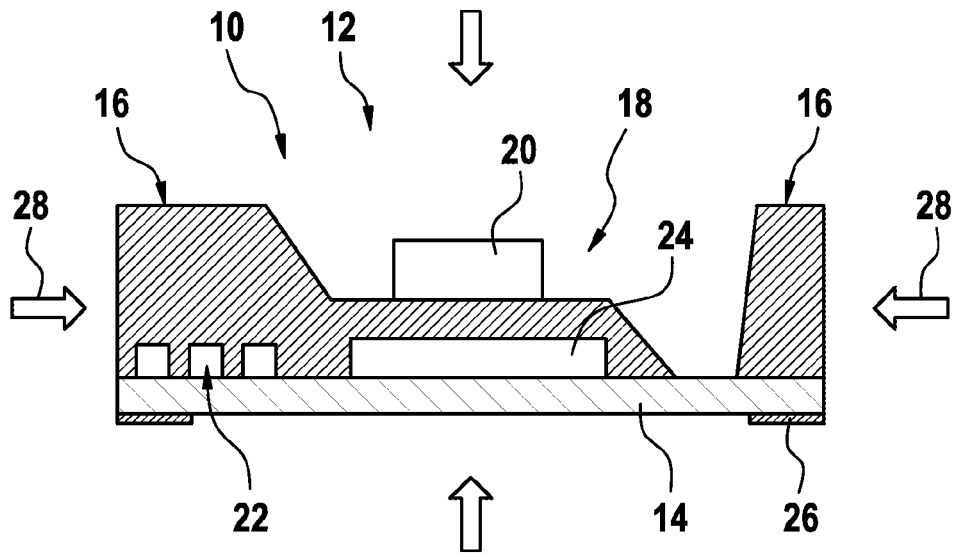
FIG. 1 shows a cut side view of a first exemplary embodiment of the pressure sensor system according to the present invention, including a substrate and the support structure formed by an LGA/MPM structure, at which an APSM pressure sensor element is accommodated, prior to the embedding of the sensor element.

Initially, a pressure sensor system, which overall is denoted by reference numeral 10, is apparent in FIG. 1, including pressure sensor unit 12 in the process of being created. LGA substrate 14 is apparent, into which passive components 22 in the form of resistors are integrated. LGA substrate 14 is already joined with ASIC 24 into a LGA/MPM support structure 16 with the aid of a plastic material. During the production of support structure 16, a cavity 18 was left exposed, into which an APSM sensor element 20, i.e., an advanced porous silicon MEMS sensor element 20, is inserted in the representation of FIG. 1. After its contacting, sensor element 20 is embedded into support structure 16, and in this way pressure sensor unit 12 according to the present invention is created.

Metallized contact elements 26 are apparent on the side of the substrate facing away from cavity 18, which are used for the electrical contacting of pressure sensor unit 12. The also apparent arrows pointing from different directions at the pressure sensor unit serve to clarify the circumstance that pressure sensor unit 12 to be subsequently introduced into an oil volume of pressure sensor system 10 is exposed there to isostatic pressure on all sides 28.

Figure 2:
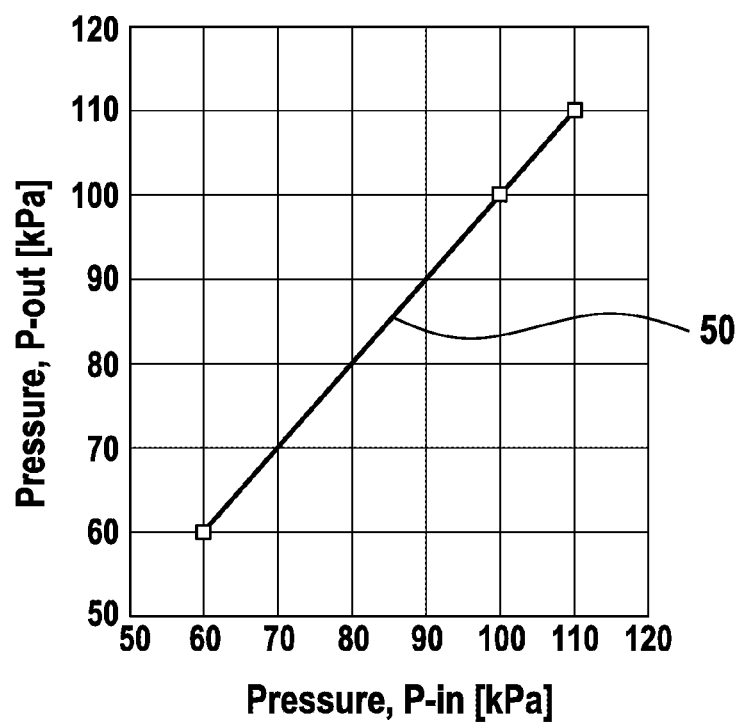
FIG. 2 shows an exemplary application of an input-side and output-side pressure signal at variably strong pressurizations of the pressure sensor unit according to the present invention, including a pressure sensor element mounted in an oil.

FIG. 2, in contrast, in the form of a graph 30, shows the input-side pressure being plotted against the output-side pressure in a pressure sensor unit 12 embedded into a silicon oil, this plot illustrating the linear electrical response of the sensor element according to the present invention to different stimuli of varying pressure magnitudes.

Figure 3A:
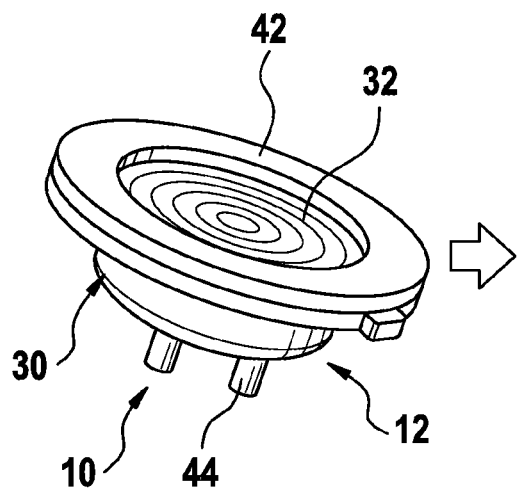
FIGS. 3a, 3b, 3c, and 3d show different perspective representations of one further exemplary embodiment of the pressure sensor system, in which the pressure sensor unit is situated in a housing.
Figure 3B:
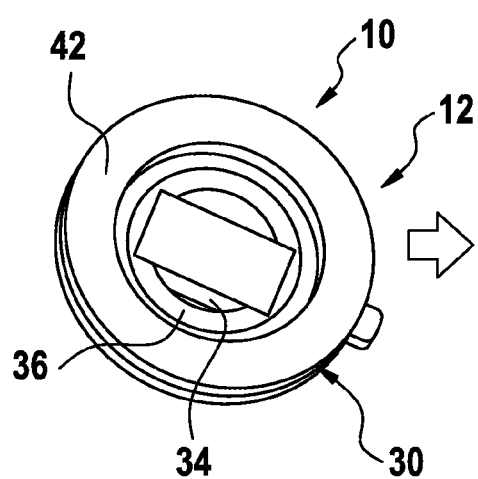
Figure 3C:
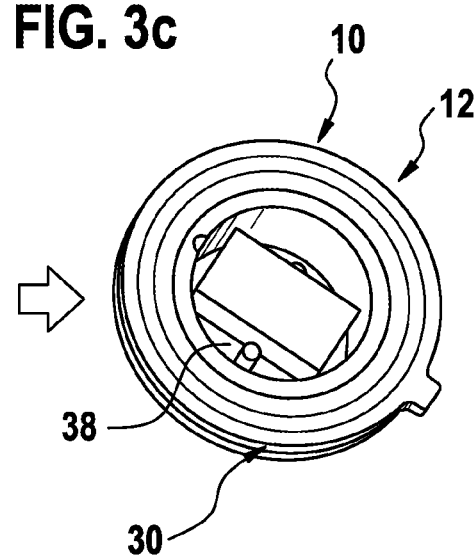
Figure 3D:
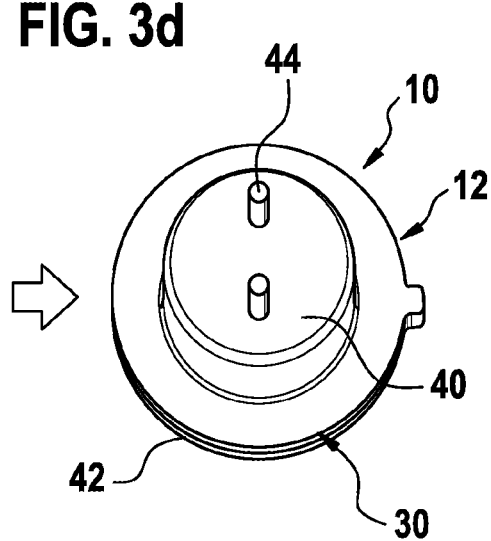

FIGS. 3a through 3d show the protection of a pressure sensor unit 12 against aggressive media by being situated in a sensor housing 30 in different perspective representations of sensor housing 30, which is the same in each case and which, after pressure sensor unit 12 has been situated, is closed and sealed by situating diaphragm 32. FIG. 3a shows sensor housing 30, diaphragm 32 being positioned over its opening, and FIG. 3b shows the same sensor housing 30 with diaphragm 32 removed, so that pressure sensor unit 12 situated behind becomes visible. Its positioning in a recess 34 is ensured with the aid of segment-like filling elements 36, which reduce the volume of oil filling 38 of the silicone oil to be filled into the sensor housing. With the filling elements, pressure sensor unit 12 encloses recesses left exposed therebetween, which are subsequently filled with the oil as fluid. The particular volume is apparent from FIG. 3c, which shows a rear view of sensor housing 30 from FIG. 3b, in which housing dome 40 was removed, which, in turn, is apparent from the representation in FIG. 3d and at which two insulated metallic contact pins 44 are guided to the outside for contacting pressure sensor unit 12.

FIGS. 4a and 4b show a different embodiment of a pressure sensor system 10 including a pressure sensor unit 12, which, however, are structurally very similar to those of FIGS. 3a through 3d. In FIG. 4a, in turn, APSM sensor element 20, which is accommodated in oil filling 38 and situated at the LGA/MPM support structure, is apparent, with which pressure sensor unit 12 is provided and situated in sensor housing 30. Diaphragm 32, which relays the pressure from the outside via oil filling 38 to sensor element 20, is held at sensor housing 30 by housing ring 42. The electrical contacting of pressure sensor unit 12 is guided to the outside by metallic contact pins 44, which are insulated with respect to the also metallic sensor housing by a respective annular glass insulation 45. FIG. 4b shows sensor housing 30 of FIG. 4a in a closed state, the oil filling being supplied into the housing interior via a filling opening 46, which is sealed by a ball pressing.

FIG. 5 finally shows one exemplary embodiment of a pressure sensor system 10 as a media-robust sensor package, which is situated in a measuring device 100 of an automotive application, which forms a so-called 2nd level periphery package. Pressure sensor system 10 is accommodated in a receptacle 107 of a package housing 102, whose electrical contacts 103 are contacted with contacts 44 of sensor housing 30 in the usage position. For the mechanical protection of its diaphragm 32, pressure sensor system 10 includes a protective member 48 in the form of an end-face, perforated plate 49 connected to sensor housing 30. Protective member 48 of sensor housing 30 of pressure sensor system 10 faces connecting piece 104 of the package, whose surface facing pressure sensor system 10 forms a flange 105 at which pressure sensor system 10 is supported. A sealing apparatus/device (arrangement) 106 in the form of an O-ring is situated between these two.

Accordingly, the above-described present invention thus relates to a pressure sensor system 10 including at least one pressure sensor unit 12, pressure sensor unit 12 being configured with at least one sensor element 20 which is situated in a cavity 18 of a support structure 16, signal processing elements being integrated into support structure 16, the at least one sensor element 20 being embeddable into support structure 16 to form pressure sensor unit 12, and support structure 16 being formed by a land grid array/mold premold structure (LGA/MPM). Pressure sensor unit 12 is introduced into a sensor housing 30 to be provided with a diaphragm 32 and is supported therein, a residual volume of sensor housing 30, which is provided with at least one diaphragm 32 and to the wiring of which pressure sensor unit 12 is electrically connected, is filled with an incompressible fluid.

Described pressure sensor system 10 enables a protection of pressure sensor unit 12, including its APSM sensor element 20 with ASIC 24 and passive components 22, and of the electrical terminals such as contact elements 26, against aggressive media by placement in an oil filling of sensor housing 30. Pressure sensor system 10 including at least one pressure sensor unit 12, on the one hand, is thus configured to be robust or protected against aggressive media, but, on the other hand, a simple temperature adjustment to compensate for the influence of the oil filling with the aid of the temperature is possible, and moreover it is cost-effective to manufacture. It has been found in the process that the particular pressure sensor system 10 is particularly advantageously used in an average pressure range between 5 bar and approximately 70 bar, for which purpose a pressure sensor unit 12, which otherwise is used for unidirectional low pressure determination, may be used for the determination of average pressures by embedding into the described oil filling of the pressure sensor system 10 under isostatic loading, without running the risk of damage.

Although the present invention has been described above based on the exemplary embodiments, it is not limited thereto, but is modifiable in a variety of ways.

What is claimed is:

1. A pressure sensor system, comprising:
    at least one pressure sensor unit, wherein the pressure sensor unit includes at least one sensor element which is situated in a cavity of a support structure, the at least one sensor element together with the support structure being embedded to form the pressure sensor unit and the support structure being formed by a land grid array/mold premold structure (LGA/MPM), the pressure sensor unit being introduced into a sensor housing to be provided with a diaphragm and being supported therein, and a residual volume of the sensor housing, which is provided with at least one diaphragm and to the wiring of which the pressure sensor unit is electrically connected, being filled with an incompressible fluid, signal processing elements of application-specific circuits being integrated on the support structure and the support structure being provided by a land grid array/mold premold structure (LGA/MPM) so that electrical contact elements are provided on its one structure side, while the at least one cavity for situating the sensor element is provided and configured on its opposite structure side facing away from the contact elements.

2. The pressure sensor system of claim 1, wherein the sensor element includes an advanced porous silicon MEMS (APSM) sensor element.

3. The pressure sensor system of claim 1, wherein the support structure includes further passive electrical structures, which are introduced into its substrate.

4. The pressure sensor system of claim 1, wherein a mechanical protective member, which essentially covers the diaphragm indirectly, is situated at a side of the diaphragm facing away from the sensor housing.

5. The pressure sensor system of claim 1, wherein the incompressible fluid is designed includes an oil and/or a synthetic oil.

6. The pressure sensor system of claim 1, wherein the incompressible fluid within the pressure sensor housing is provided so that the sensor element is exposed to an isostatic pressure.

7. A method for manufacturing a pressure sensor system, which includes at least one pressure sensor unit, the method comprising:
    manufacturing the at least one pressure sensor unit by providing a sensor element, situating the sensor element in a cavity of a support structure into which at least one signal processing element, in particular, an ASIC, is integrated, and subsequently embedding the support structure including the sensor element to form the pressure sensor unit, the support structure being provided by a land grid array/mold premold structure (LGA/MPM) so that electrical contact elements are provided on its one structure side, while the at least one cavity for situating the sensor element is provided and configured on its opposite structure side facing away from the contact elements;
    introducing the pressure sensor unit into a pressure sensor housing to be provided with a diaphragm, and supporting the pressure sensor unit in the pressure sensor housing;

connecting the pressure sensor unit to the electrical wiring of the pressure sensor housing, filling a residual volume remaining inside the pressure sensor housing with an incompressible fluid; and closing the pressure sensor housing by a diaphragm or an opening closure.

8. The method of claim 7, wherein the pressure sensor unit, including the sensor element, is temperature-compensated prior to being embedded into the pressure sensor housing.

9. The method of claim 7, wherein the electrical terminals of the pressure sensor unit, after introduction into the pressure sensor housing, are situated facing away from the diaphragm in the usage position.

10. The method of claim 7, wherein at least one or multiple filling elements is situated between one or multiple housing areas of the pressure sensor housing and the pressure sensor unit.

11. The method of claim 10, wherein one filling element or a multitude of filling elements within the pressure sensor housing, if necessary, together with the pressure sensor unit with its sensor element, form a closed structure.

12. The method of claim 7, wherein pressures in an average pressure range between approximately 1 bar and 100 bar, and are determined using the pressure sensor system.

13. A measuring device, comprising:
at least one pressure sensor system, which includes at least one pressure sensor unit, wherein the pressure sensor unit includes at least one sensor element which is situated in a cavity of a support structure, the at least one sensor element together with the support structure being embedded to form the pressure sensor unit and the support structure being formed by a land grid array/mold premold structure (LGA/MPM), the pressure sensor unit being introduced into a sensor housing to be provided with a diaphragm and being supported therein, and a residual volume of the sensor housing, which is provided with at least one diaphragm and to the wiring of which the pressure sensor unit is electrically connected, being filled with an incompressible fluid, signal processing elements of application-specific circuits being integrated on the support structure and the support structure being provided by a land grid array/mold premold structure (LGA/MPM) so that electrical contact elements are provided on its one structure side, while the at least one cavity for situating the sensor element is provided and configured on its opposite structure side facing away from the contact elements;

wherein a number of receptacles corresponding to the number of pressure sensor systems are provided at the measuring device, in which the at least one pressure sensor system is accommodated, in the usage position, so that it is supported at a kind of flange of a connecting piece of the measuring device with an edge formed by a housing ring, with a diaphragm facing a working fluid.

14. The measuring device of claim 13, wherein a sealing arrangement, which includes an O-ring, is situatable or situated between the housing ring of the pressure sensor system and the flange of the connecting piece.

* * * * *